United States Patent [19]

Takagi et al.

[11] Patent Number: 4,597,470

[45] Date of Patent: Jul. 1, 1986

[54] CAR SPEAKER SYSTEM

[75] Inventors: Kazunori Takagi, Saitama; Hiroshi Soma, Tokyo; Yoshiaki Miyata; Yasuki Motozawa, both of Saitama; Hitoshi Katou, Tokyo, all of Japan

[73] Assignees: Pioneer Electronic Corporation; Honda Giken Kogyo Kabushiki Kaisha, both of Tokyo, Japan

[21] Appl. No.: 725,859

[22] Filed: Apr. 22, 1985

[30] Foreign Application Priority Data

Apr. 22, 1984 [JP] Japan ................................ 59-80923

[51] Int. Cl.⁴ ............................................. G10K 5/04
[52] U.S. Cl. .................................. 181/141; 181/144; 381/86; 179/146 E
[58] Field of Search .................. 181/141, 144–147, 181/150; 381/86; 179/146 E

[56] References Cited

U.S. PATENT DOCUMENTS 1,941,961  1/1934  Tichenor et al. ............... 179/146 E
4,056,165  11/1977  Okamoto et al. ................. 381/86 X
4,441,577  4/1984  Kurihara ............................ 381/86 X

*Primary Examiner*—Benjamin R. Fuller
*Attorney, Agent, or Firm*—Sughrue, Mion, Zinn, Macpeak & Seas

[57] ABSTRACT

A car speaker system which can be used to radiate sound either inside the vehicle in normal driving use or outside the vehicle when the vehicle is parked. A plurality of speaker units are mounted in a closed cabinet and the cabinet is swingably mounted along one side thereof in a casing. In a first swinging position of the cabinet, the speaker mounting surface of the cabinet is flush with the ceiling panel and the speakers radiate sound downwards into the passenger compartment of the vehicle, while in a second swinging position of the cabinet, the speaker mounting surface is perpendicular to the ceiling panel and the speakers face rearwards to radiate sound to the exterior through an open hatchback door.

11 Claims, 16 Drawing Figures

CAR SPEAKER SYSTEM

BACKGROUND OF THE INVENTION

The present invention relates to car speaker systems, and more particularly, to a car speaker system adapted to be installed in a high-roof hatchback car having a door at its rear surface.

As a car speaker system of this kind, there has hitherto been known a door-mounted speaker system wherein speaker units are mounted in the interior of doors and a surface-mounted speaker system wherein speaker units contained in a cabinet are mounted on a deck. However, these systems can be used only in the interior of a car since the sound produced by either system is radiated in a fixed direction. Furthermore, in the latter system, the system projects from the deck. There is a disadvantage, therefore, that the field of view of the rear-view mirror through the window of the rear door is reduced.

For ordinary driving, a listener can enjoy music with a car stereo system, but once the listener gets out of the car for the purpose of camping or the like, a conventional car stereo system is not useful. Heretofore, a portable, compact audio system such as a radio receiver with a cassette deck was necessary to play music outdoors. In such a portable compact audio system, however, the size of the speaker unit is limited and sufficient power and presence are not obtainable.

SUMMARY OF THE INVENTION

The present invention has been made in view of the foregoing, and an object of the invention is to provide a car speaker system which is usable in the interior as well as exterior of a car and which provides sufficient power and presence even when used exterior to the car.

A car speaker system according to the present invention is of closed cabinet construction containing a plurality of speaker units, inclusive of drone-cone speakers, in an integral fashion. The closed cabinet has one end rotatably mounted to the rear portion of a ceiling panel in a high-roof type hatchback car and is intended to take at least two positions, a first position in which its speaker mounting surface is substantially parallel to the ceiling panel with the bulk of the cabinet being received above the ceiling panel, and a second position in which the speaker mounting surface is substantially at right angles thereto. Further, at least one of the speaker units can be swingably mounted to the cabinet via a closed sliding member.

Further in accordance with the present invention, the cabinet may include a first section to which a plurality of speaker units are mounted, a second section joined to the first section and adapted to form a space around the rear portions of the plurality of speaker units, a fitting section constructed of a concave portion fitted with a convex portion, and a guide section for positioning the concave portion in relation to the convex portion upon fitting.

DESCRIPTION OF THE PREFERRED EMBODIMENTS

The present invention will hereinbelow be described by way of example with reference to the drawings.

Figure 1:
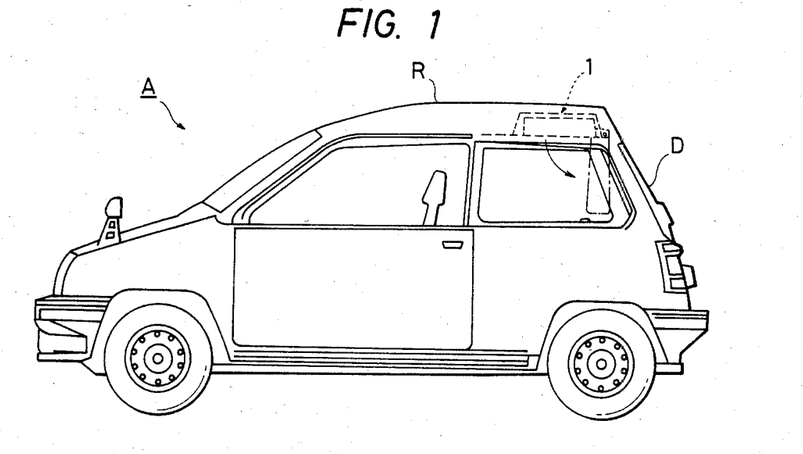
FIG. 1 is a side view of a high-roof type hatchback car in which is installed a car speaker system according to the present invention.
Figure 2:
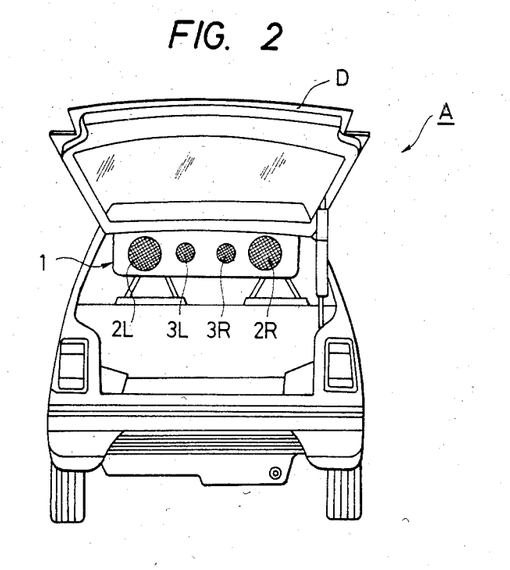
FIG. 2 is a rear view of the hatchback car with its rear door open showing the manner in which the car speaker system is used for the exterior of the car.

In FIG. 1, A designates a car in which is installed a speaker system according to the present invention, the car A being a high-roof type hatchback car whose roof is higher than those of ordinary cars and which has a door D at its rear surface. A speaker system 1 is mounted on the inner surface of the rear portion of a ceiling panel R in the inside of the car A. This speaker system 1 is rotatably mounted such that it can be set in at least two positions, namely, a first position shown by a broken line and a second position shown by a single-dot/dash line in FIG. 1. In the first position, the speaker system 1 is fixed to the car body by means of a locking mechanism, which will later be described in detail. In the second position, the speaker mounting surface of the speaker system 1 is substantially in an upright position and each speaker faces rearwardly of the car body, as shown in FIG. 2.

Figure 3:
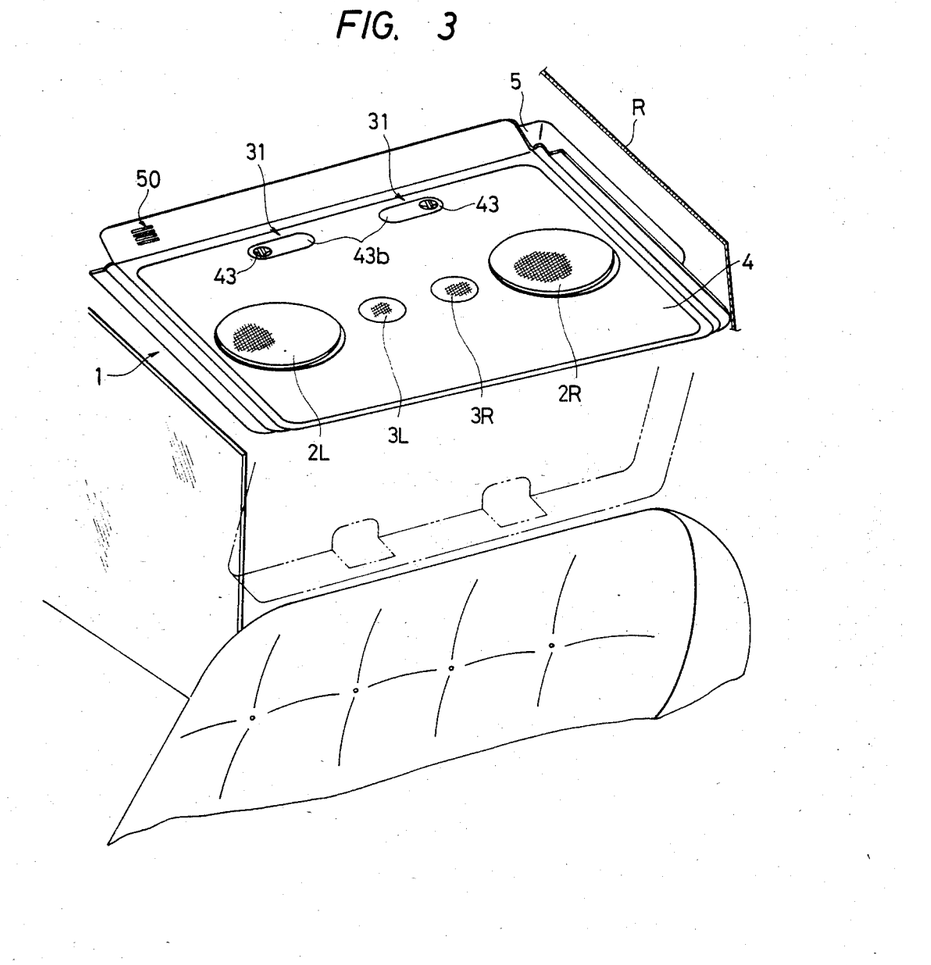
FIG. 3 is a perspective bottom view showing the manner in which the car speaker system is used for the interior of the car.
Figure 4:
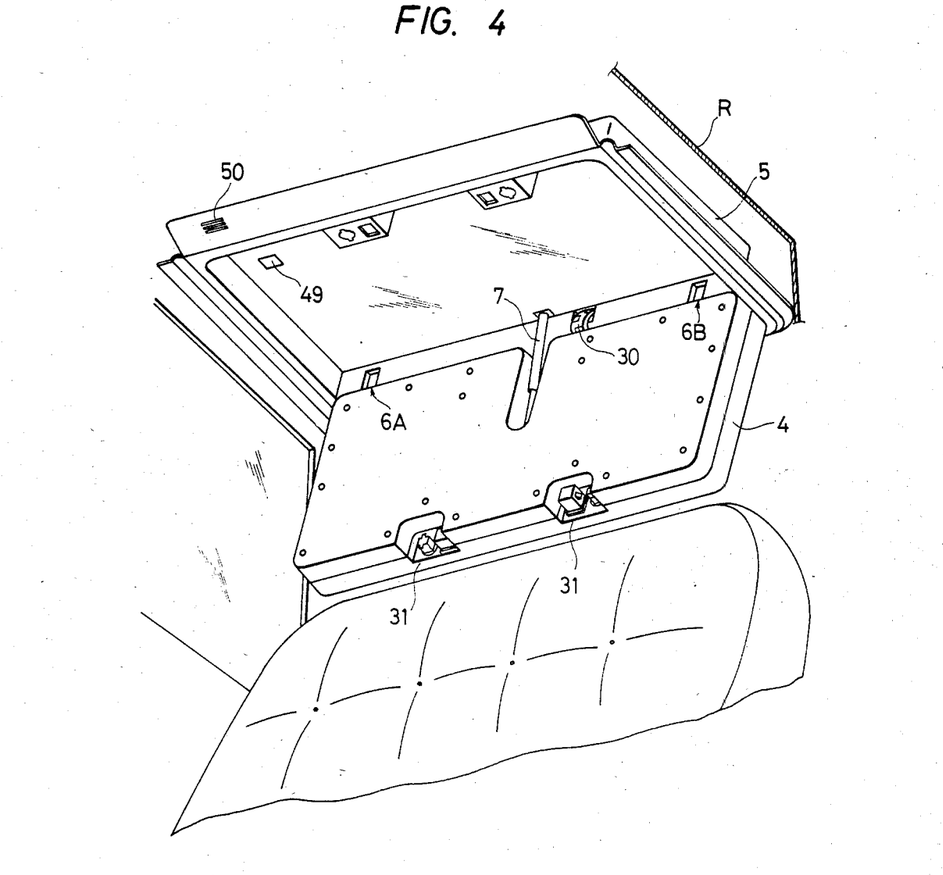
FIG. 4 is a perspective bottom view showing the manner in which the car speaker system is used for the exterior of the car.

As is clear particularly from FIG. 3 and FIG. 4, the speaker system 1 includes a pair of large-diameter speaker units 2L, 2R, a pair of small-diameter speaker units 3L, 3R, a closed cabinet 4 containing all of these speaker units therein, and a casing 5 fixed to the ceiling panel R in the interior of the car and adapted to receive the cabinet 4. The cabinet 4 is rotatably connected to the casing 5 by means of hinges 6A, 6B provided at respective ends of the rear side of the casing 5. The speaker units 3L, 3R are actuated by vibrations of the speaker units 2L, 2R and function as drone cone speakers to produce bass sound. It is for this purpose that the cabinet 4 should be closed.

A shock absorber 7 is disposed between the cabinet 4 and the casing 5 to enforce gradual and slow rotation of the cabinet 4. When the cabinet 4 is in a fully opened position (the aforementioned second position) as shown in FIG. 2 and FIG. 4, the shock absorber 7 is extended to a maximum so as to prevent further opening of the casing 4 and to act as a resistance element for the purpose of preventing closing of the cabinet 4 due to external loading due to vibration or the like.

A click mechanism of known construction may be incorporated in the shock absorber 7 so as to permit selective rotation and holding of the cabinet 4 at any angle. However, this click mechanism need not necessarily be incorporated in the shock absorber 7 and alternatively may be integrated with the hinges 6A, 6B, or may be provided alone in a rotary connecting portion. In addition, the rotary connecting portion may be constructed in such a manner as to be electrically driven by a motor or the like in order to allow selectively rotation and holding of the cabinet 4 at any angle.

Figure 5:
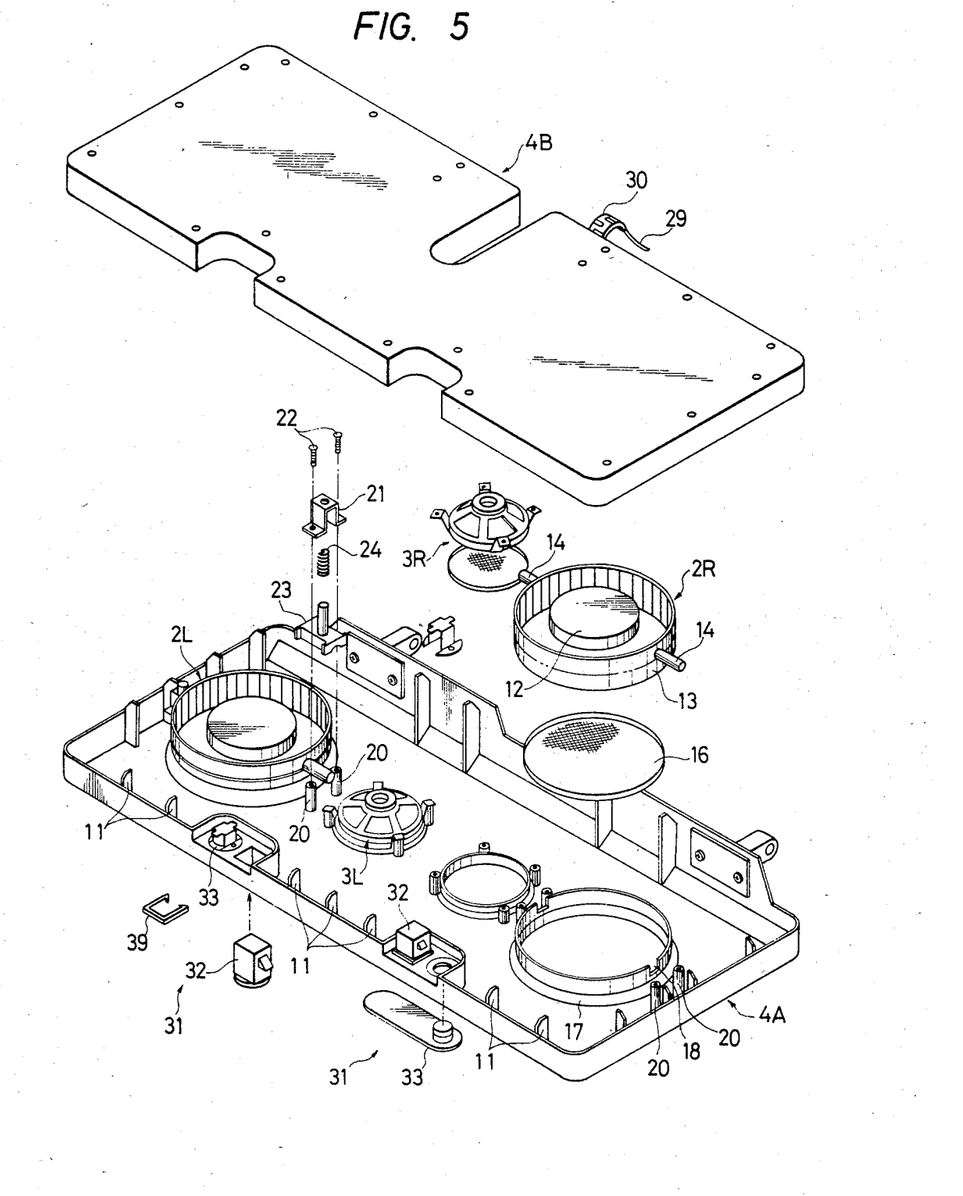
FIG. 5 is an exploded perspective view showing the car speaker system according to the invention.
Figure 6:
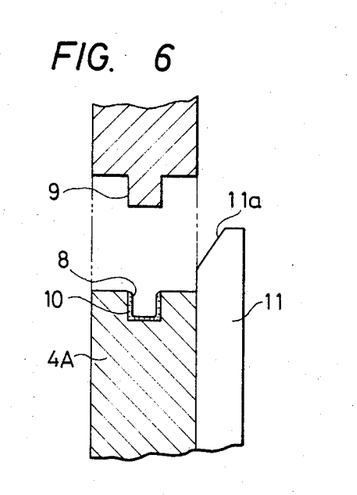
FIG. 6 is a sectional view showing a fitting construction of a cabinet shown in FIG. 5.

The cabinet 4 includes a first section 4A to which the speaker units 2L, 2R and 3L, 3R are mounted, and a second section 4B joined to the first section and adapted to form a space or rear cavity around the rear portions of the speaker units 2L, 2R and 3L, 3R, as shown in FIG. 5. The cabinet 4 is made of resinous material. A connecting section, of which the first section is connected to the second section, is constructed of a combination of a concave portion 8 formed at the first section 4A and a convex portion 9 fitted in the concave portion 8 to thereby maintain the airtightness of the cabinet 4. To improve the airtightness, resin 10, such as silicone or the like, is coated over the concave portion 8. Alternatively, a ring made of rubber may be employed to cover the concave portion 8 instead of coating the same with the resin 10.

Formed integrally in the inner side of the first section 4A are a plurality of guide pieces 11, each projecting higher than the opening surface of the concave portion 8 and having an inclined surface 11a inclined outwardly from the end thereof. These guide pieces 11 are used to position the concave portion 8 in relation to the convex portion 9 under the influence of the respective inclined surfaces 11a when the first section 4A is connected to the second section 4B, thereby effecting positive connection of the first section 4A with the second section 4B.

In FIG. 5, the pair of small-diameter speaker units 3L, 3R are fixedly mounted adjacent to the central portion of the cabinet 4. On the other hand, the pair of large-diameter speaker units 2L, 2R are mounted outside of the corresponding small-diameter speaker units 3L, 3R, swingably with respect to the cabinet 4. As is clear particularly from FIG. 7, the large-diameter speaker unit 2L (2R) includes a speaker body 12, a cylindrical grille 13 adapted to cover the outer periphery of the speaker body 12 while retaining the same therein, and a pair of supporting shafts 14 projecting from the outer peripheral surface of the grille 13. With this arrangement, the large-diameter speaker unit 2L (2R) is swingably supported in the cabinet 4 by means of the pair of supporting shafts 14. The outer peripheral surface of the grille 13 is curved, the center of which is the point where the pair of supporting shafts 14 intersect the central axis of the grille 13. Formed around a front opening 13a of the grille 13 is an annular slot 15. A protective net 16 is fitted in the annular slot 15 and fixed thereto by means of a bonding agent or the like.

Figure 7:
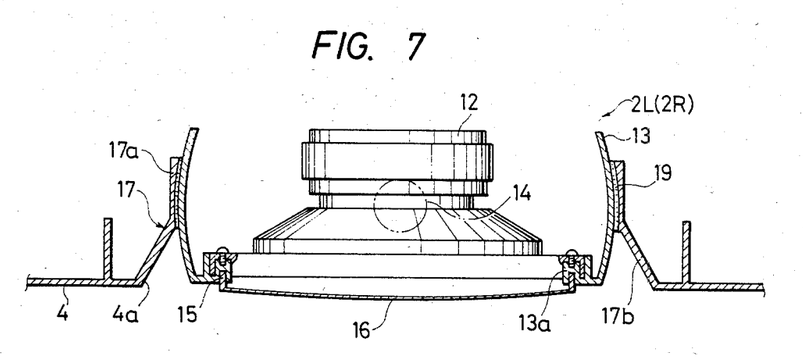
FIG. 7 is a sectional view showing the manner in which a speaker unit of FIG. 5 is mounted.

The cabinet 4 is integrally formed with an upright portion 17, including a cylindrical portion 17a having a diameter less than the inner diameter of a front opening 4a and an inclined portion 17b extending between the cylindrical portion 17a and the front opening 4a. The inner peripheral surface of the cylindrical portion 17a has substantially the same curvature as the outer peripheral surface of the grille 13. Further, the cylindrical portion 17a has recesses 18 for receiving the respective supporting shafts 14 of the grille 13. The speaker unit 2L (2R) is fitted in the cylindrical portion 17a in such a manner as to swing with respect to the supporting shafts 14. A piece of felt 19, acting as a sealing member, is attached to the inner peripheral surface of the cylindrical portion 17a as shown in FIG. 7. This piece of felt 19 is employed to maintain the airtightness of the cabinet 4 irrespective of the position of the speaker unit 2L (2R), and also functions to retain the speaker unit 2L (2R) at any desired swinging angle due to its frictional resistance.

Figure 8:
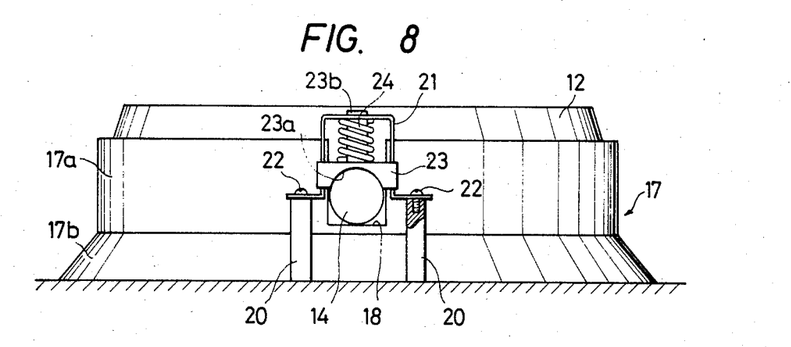
FIG. 8 is a side view showing a supporting construction of a supporting shaft in the speaker unit of FIG. 5.

A bracket 21 is fixed on two projections 20 provided adjacent the recess 18 by means of screws 22. A sliding shaft 23b of a bearing member 23, having at its bottom surface a semi-circular slot 23a, is inserted via a spring 24 into a central hole 21a of the bracket 21. As shown in FIG. 8, the bearing member 23 is adapted to rotatably support the supporting shaft 14 in such a manner that the semi-circular slot 23a is contacted under pressure with part of the peripheral wall of the supporting shaft 14 fitted in the recess 18 under the action of the spring 24.

Figure 9:
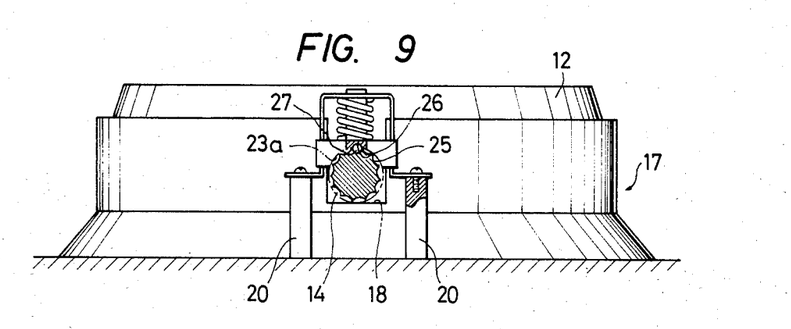
FIG. 9 is a side view, partly sectioned, showing a modified form of the arrangement of FIG. 8.
Figure 10:
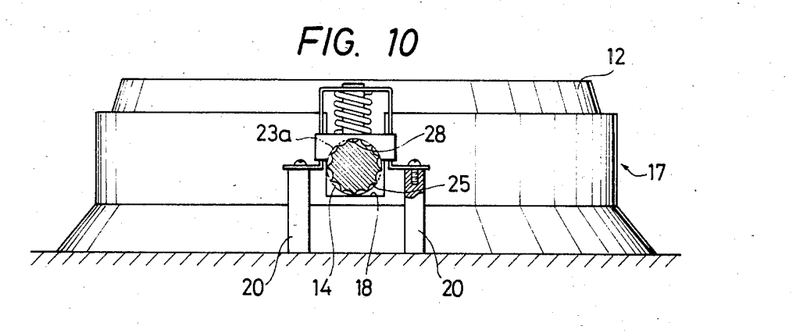
FIG. 10 is a side view, partly sectioned, showing a further modified form.

As shown in FIG. 9, a plurality of concave portions 25 are formed at the peripheral wall of the supporting shaft 14, and a steel ball 27 is rotatably disposed in a semi-circular concave portion 26 formed at the central portion of the semi-circular slot 23a of the bearing member 23. A click mechanism is thereby formed by the plurality of concave portions 25 and the steel ball 27, and any desired tilt angle of the speaker unit 2L (2R) can thus be established. The spring 24 biases the bearing member 23 and the steel ball 27 against the peripheral wall of the supporting shaft 14 of the bearing member 23 and the concave portions 25, respectively. Alternatively, such a click mechanism may be constructed with a projection 28 projecting from the inner surface of the semi-circular portion 23a, as shown in FIG. 10, in lieu of the steel ball 27. In such a construction, substantially the same advantageous effects result. It will be appreciated that the construction of a click mechanism is not limited to that described above, and that a variety of modified forms may be employed.

In this example, the speaker units 2L, 2R are swingable supported on the rotary surface of the cabinet 4 by means of the above-mentioned supporting mechanism, and are swingable forwardly and rearwardly of the car body, as shown in FIG. 3, while being swingable upwardly and downwardly, as shown in FIG. 4. By combining a similar supporting mechanism with the above-mentioned supporting mechanism in a cross-like fashion, the speaker units 2L, 2R can be made swingable in the widthwise direction of the car in addition to the above directions.

Figure 11A:
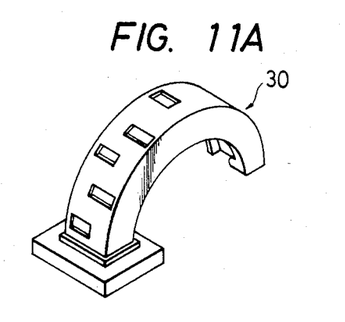
FIG. 11A and 11B are perspective views, viewed from the top and bottom, respectively, showing a cover member of the speaker system of FIG. 5.
Figure 11B:
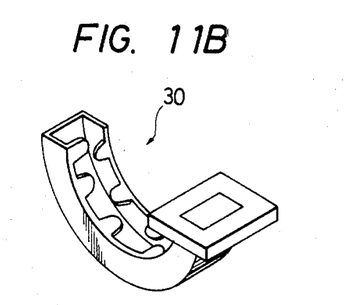

An insulating layer (not shown) is attached to substantially the whole inner surface of the second section 4B in the cabinet 4. This insulating layer is intended to prevent the occurrence of vibration of the cabinet 4 due to vibration of the speaker units 2L, 2R and 3L, 3R. Additionally, sound absorbing material (not shown)

such as glasswool or the like is provided particularly rearwardly of the large-diameter speaker units 2L, 2R so as to prevent standing waves within the cabinet 4 and to otherwise control the reflected waves. An audio signal is applied to the respective speaker units 2L, 2R and 3L, 3R contained in the cabinet 4 via a lead wire 29 entering the cabinet 4 through an opening (not shown) formed at the side of the second section 4B. One end of a semi-circular cover member 30 of square section as shown in FIGS. 11A and 11B is fixed to the opening through which the lead wire 29 passes; the lead wire 29 is contained in this cover member 30. The cover member 30 has a curved portion, the center of which is the rotary central shaft of the cabinet 4. The lead wire 29 is always covered by the cover member 30, irrespective of the rotational position of the cabinet 4. Thus, the lead wire 29 is not exposed to the exterior in use, thereby improving the appearance of the installation.

As shown in FIGS. 4 and 5, the cabinet 4 is provided with two locking mechanisms 31 of like construction used to lock the cabinet against the car body, as shown by broken lines in FIGS. 1 and 3. The locking mechanism 31 includes a first locking device 32 for automatic locking and a second locking device 33 for manual locking after locking is completed by the first locking device 32, the locking mechanism thus being of a dual-locking construction.

Figure 12:
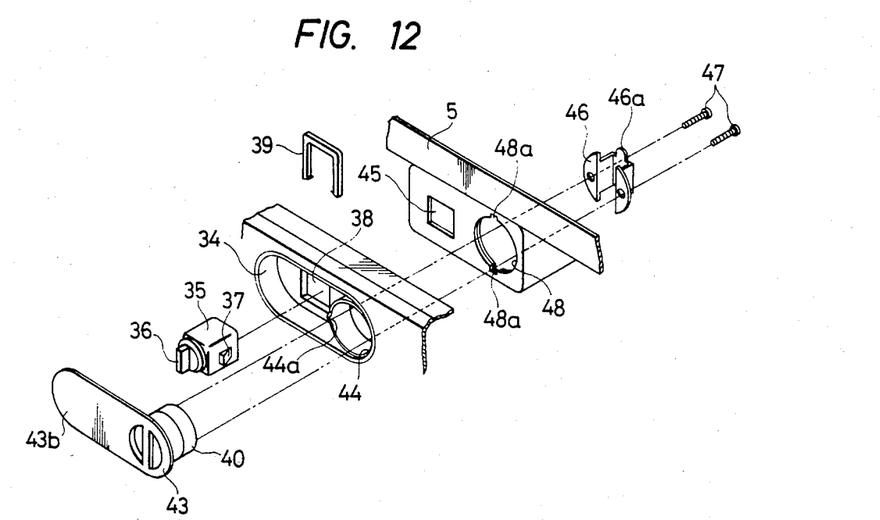
FIG. 12 is an exploded perspective view showing a locking mechanism depicted in FIG. 4.

As is clear particularly from FIG. 12, an elliptic concave portion 34 is formed at the front surface of the cabinet 4. The first and second locking device 32 and 33 are disposed in the concave portion 34. The first locking device 32 includes a base body 35, a control knob 36 rotatably mounted to this base body 35, and locking pawls 37 projecting from both sides of the base body 35 upon rotation of the control knob 36. In this arrangement, the first locking device 32 is inserted into a square hole 38 formed at the bottom surface of the concave portion 34 and is thereafter fixed to the cabinet 4 by means of a U-shaped locking member 39. Then, with the cabinet 4 rotated from the open position of FIG. 4 so as to be contained in the casing 5, the locking pawls 37 are biased under the influence of the inner surface of the square hole 45 and thus are retracted into the interior of the base body 35. After the locking pawls 37 pass through the square hole 45, locking is automatically effected.

Figure 13:
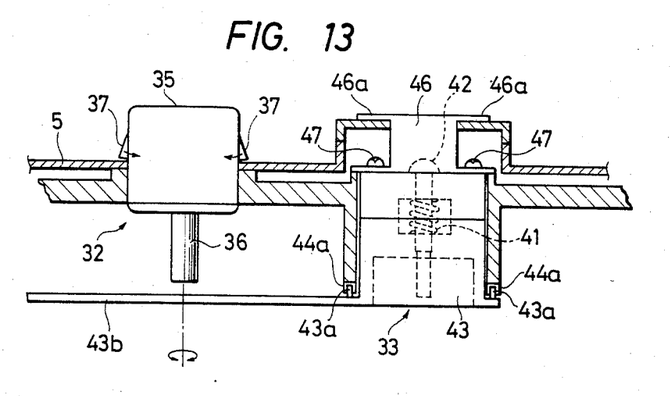
FIG. 13 is a sectional view of the locking mechanism in its locked position.

The second locking device 33 includes a column-like base body 40 and a control knob 43 fixed via a spring 41 to the base body 40 by means of a screw 42, as shown in FIG. 13. The second locking device 33 is inserted into an upstanding cylindrical portion 44, and thereafter a bracket 46 having a locking piece 46a is fixed to the bottom surface of the base body 40 by two screws 47. Recesses 44a are formed at the end surface of the cylindrical portion 44. The control knob 43 has on its inner surface projections 43a for fitting with the recesses 44 in a locked position and is integrated with a cover body 43b for closing the opening of the concave portion 34 in the locked position. In an unlocked position, the locking piece 46a of the bracket 46 is aligned with a recess 48a of a round hole 48 formed at the casing 5. Upon turning the control knob 43 to the locked position, the bracket 46 also rotates, reaching the locked position as shown in FIG. 13. If the control knob 43 is merely turned in an attempt to release the locked state, release of the locked state is prevented since the projections 43a are in engagement with the recesses 44a. The locking state can only be released by first pulling the control knob 43 against the action of the spring 41 (see FIG. 13) so as to release the engagement of the projections 43a with the recesses 44a, and then turning the control knob 43.

Figure 14:
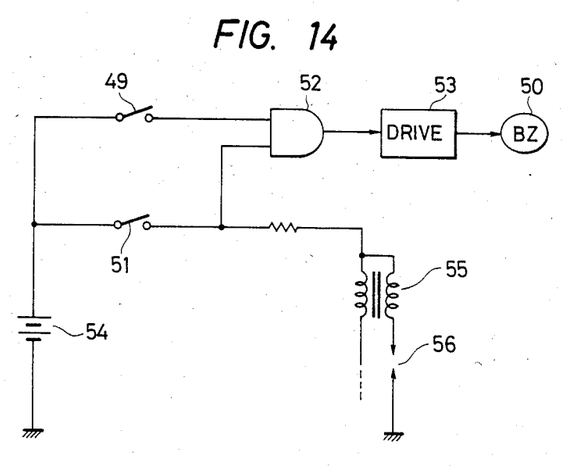
FIG. 14 is a circuit diagram showing a driving system for an alarm buzzer shown in FIG. 4.

As shown in FIG. 4, the casing 5 is provided with a detecting switch 49 used to detect, for example, whether the cabinet 4 is not locked by the locking mechanisms 31, namely, whether the cabinet 4 is in its unlocked position. An alarm buzzer 50 is also provided. The detecting switch 49 has a pair of contacts which are open when the cabinet 4 is in its closed position (FIG. 3) and closed when the cabinet 4 is in its opened position (FIG. 4). Thus, a high-level detection output is generated when the cabinet 4 is in its opened position. In FIG. 14, the output of the detecting switch 49 is applied one input of an AND gate 52, the other input of which receives an output from an ignition switch 51. The output of the AND gate, via an actuating circuit 53, actuates the alarm buzzer 50. That is to say, when the cabinet 4 is in its opened position, the field of rear view is disturbed by the cabinet 4. Thus, for purposes of safe driving, the alarm buzzer 50 is actuated to generate a loud audio alarm signal when the ignition switch is turned on and the above detecting output is generated. As an alternative means for detecting the open state of the cabinet 4, an optical device may be used. Also, in place of the alarm buzzer 50, an alarm light may be disposed in view of the driver. In FIG. 14, reference numeral designates a battery, 55 designates an ignition coil, and 56 designates a spark plug.

The operation of the present invention will now be described.

The cabinet 4 is normally locked to the casing 5, namely, in the first position (the position shown in FIG. 3) by means of the locking mechanism 31 so that its speaker mounting surface is substantially flush with the ceiling panel R. In this state, the speaker units 2L, 2R and 3L, 3R are used when the car is being driven. In this use, the respective speaker units are situated above the head of a passenger sitting on the rear seat. However, since the large-diameter speaker units 2L, 2R are swingably mounted to the cabinet 4, the direction of sound may be selected by changing the angles of the speaker units.

In the event that the speaker units 2L, 2R and 3L, 3R are to be used to radiate sound exterior of the car, a rear door D is opened and locking of the two locking mechanisms 31 in FIG. 3 is released. In FIG. 13 showing the manner in which the locking mechanism 31 is locked, the control knob 43 of the second locking device 33 is first pulled against the action of the spring 41 and is thereafter turned so as to release locking of the bracket 46 to the casing 5 by the locking piece 46a. Although the first locking device 32 has up to now been in an inoperable condition since it is covered by the cover body 43b of the control knob 43, it is now rendered operable by turning the control knob 43. Next, upon turning the control knob 36, the locking pawls 37 are inserted into the base body 32 so as to release the locked state of the first locking device 32.

Figure 15:
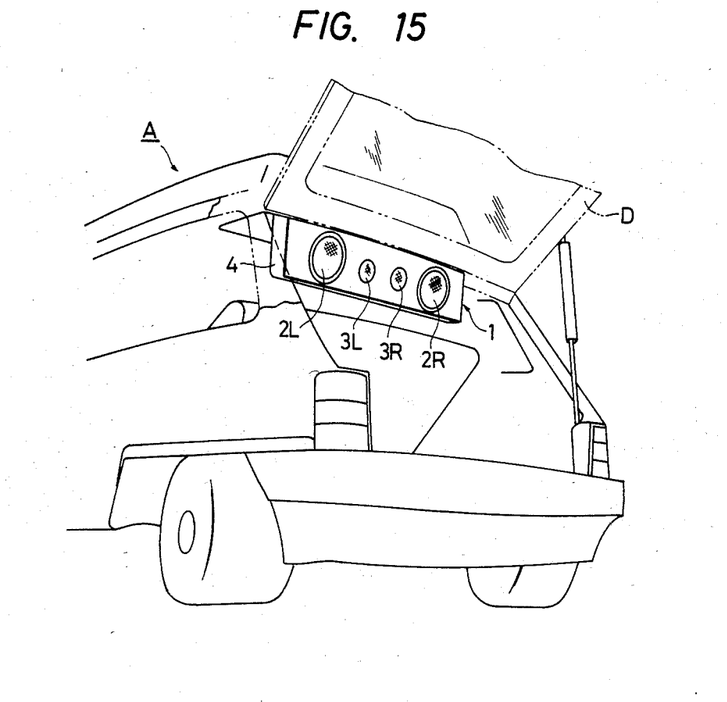
FIG. 15 is a perspective view, viewed diagonally and rearwardly, showing the manner in which the car speaker system is used for the exterior of the car.

When the two locking mechanisms 31 are released, the cabinet 4 is in an operable condition. The cabinet can then be rotated, at a rate controlled by the shock absorber 7 (FIG. 4), until it reaches the second position (the position shown in FIG. 4) in which the speaker mounting surface is substantially at a right angle to the casing 5. In this second position, the respective speaker units 2L, 2R and 3L, 3R face rearwardly of the car body (as shown in FIG. 15) so that they can radiate sound exterior of the car. In this case also, the radiated direction of sound may be selected by swinging the large-diameter speaker units 2L, 2R in a similar manner to the case in which they are used in the interior of the car. In this use, a car radio receiver or cassette deck may be employed as a source of sound signals.

Figure 16:
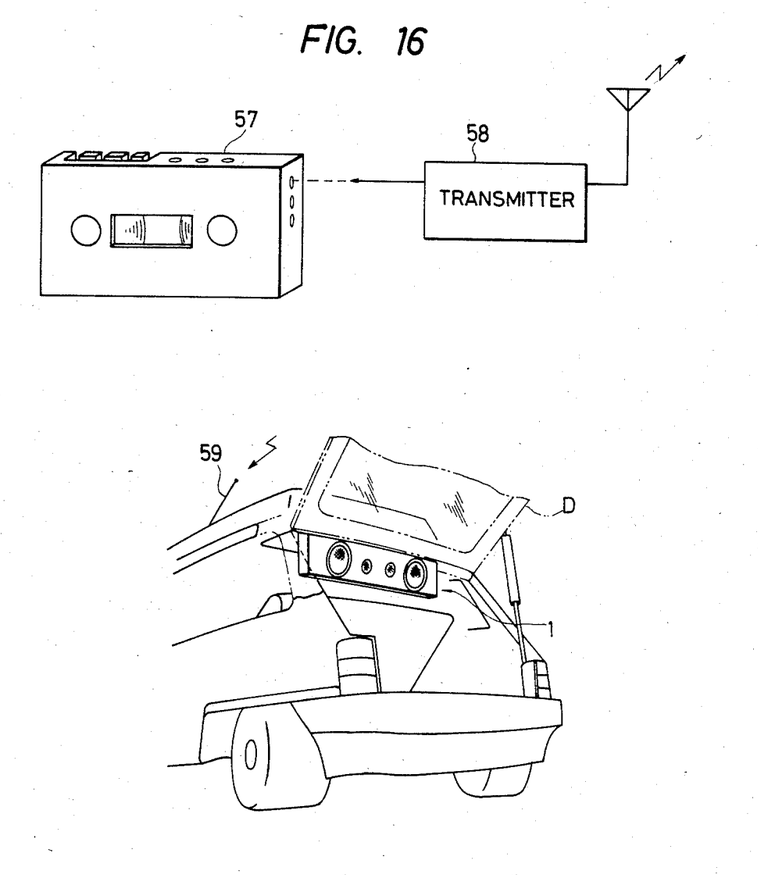
FIG. 16 is a schematic view of the car speaker system in another use.

In another use, a portable compact cassette player 57 (headphone-type stereo or stereo radio cassette) can be used as a source of sound signals, or a transmitter 58 can be connected thereto for the purpose of transmitting FM stereo waves for sound reproduction. These waves are received by an FM stereo receiver (not shown) via an antenna 59, and the corresponding reproduced sound waves radiated from the speaker system 1. In this use, remote control may easily be effected.

In the above example, the speaker system 1 is not removable from the car body. However, for instance, by rotatably and removably mounting the speaker system 1 to the car body by the provision of a removable rotary supporting construction in the cabinet 4, the multi-way speaker system 1 may be moved to the exterior.

As hereinabove described according to the present invention, a closed cabinet containing a plurality of speaker units, inclusive of drone cone speakers, has one end rotatably mounted to the rear portion of a ceiling panel in a high-roof type hatchback car. The cabinet can assume at least two positions, namely, a first position in which its speaker mounting surface is substantially flush with the ceiling panel, and a second position in which the speaker mounting surface is at a right angle to the ceiling panel. In this arrangement, a car speaker system is provided which is usable in the exterior as well as the interior of the car and which provides sufficient power and presence. Furthermore, since drone cone speakers are employed as base speakers, requiring no driving structures, the thickness and weight of the cabinet may be reduced and the cabinet readily contained in the ceiling panel. Moreover, by swingably mounting one of the speaker units to the cabinet and disposing a closed sliding member between the speaker unit and the cabinet, the sound can be made to radiate in any desired direction.

Furthermore, according to the present invention, the cabinet may have a first section to which a plurality of speaker units are mounted, a second section joined to the first section and adapted to form a space around the rear portions of the speaker units, a fitting section including a concave portion fitted with a convex portion, and a guide section adapted to position the concave portion in relation to the convex portion upon fitting. Thus, there is obtained a cabinet construction for a car speaker system which provides easy assembly and positive airtightness.

We claim:

1. A car speaker system for vehicular use for a vehicle having a door at its rear end, comprising a plurality of speaker units; a cabinet containing said plurality of speaker units therein, one end of said cabinet being rotatably mounted to a rear portion of a ceiling panel of said vehicle such that said cabinet can be swung between a first, upper position where a speaker mounting surface of said cabinet is substantially parallel with said ceiling panel and wherein said speaker units are pointed generally toward the interior of said vehicle, and a second, lower position where said speaker mounting surface is in a substantially upright position with said cabinet being in a substantially pendant position, and wherein said speaker units are pointed generally toward the rear exterior of said vehicle; and locking means for locking said cabinet in said first position.

2. The car speaker system of claim 1, wherein said speaker cabinet is a closed cabinet.

3. The car speaker system of claim 2, wherein at least one of said speaker units is a drone cone speaker.

4. The car speaker system of claim 1, further comprising a casing for receiving said cabinet in a space above said ceiling panel.

5. The car speaker system of claim 4, wherein said locking means comprises first and second locking mechanisms for locking said cabinet to said casing in said first position, each of said locking mechanisms comprising first and second locking devices, said first locking device being an automatic locking device and said second locking device being a manual locking device.

6. The car speaker system of claim 5, wherein said first locking device comprises a base body fitted in an elliptic concave portion of a front surface of said cabinet, a control knob rotatably mounted to said base body, and at least one locking pawl projectable from said base body upon rotation of said control knob to engage with said casing when said cabinet is in said first position; and wherein said second locking device comprises a column-like base body extending through a cylindrical portion of said casing in said elliptical concave portion, a control knob fixed via a spring to said base body, and a bracket having a locking piece fixed to a bottom surface of said base body.

7. The car speaker system of claim 2, further comprising a supporting mechanism for swingably supporting at least one of said speaker units with respect to said cabinet, and a sealing member disposed between the swingably supported speaker unit and said cabinet for maintaining airtightness of said cabinet.

8. The car speaker system of claim 2, wherein said cabinet comprises a first section to which said plurality of speaker units are mounted, a second section joined to said first section and defining a space around rear portions of said plurality of speaker units, a fitting section comprising a concave portion and a convex portion for joining said first section to said second section while maintaining airtightness therebetween, and a guide section provided at at least one of said first and second sections for positioning said concave portion in relation to said convex portion upon fitting said convex portion to said concave portion.

9. The speaker system of claim 1, wherein said speaker mounting surface is substantially flush with said ceiling panel when said cabinet is in said first position.

10. A car speaker system for vehicular use in a vehicle having a door at its rear end, comprising; a plurality of speaker units; a cabinet containing said plurality of speaker units therein, one end of said cabinet being rotatably mounted to a rear portion of a ceiling panel of said vehicle such that said cabinet can be swung between a first position where a speaker mounting surface of said cabinet is substantially parallel with said ceiling panel, and a second position where said speaker mounting surface is in a substantially upright position; and locking means for locking said cabinet in at least said first position, said locking means comprising first and second locking devices, said first locking device being an automatic locking device and said second locking device being a manual locking device.

11. A car speaker system for vehicular use in a vehicle having a door at its rear end, comprising; a plurality of speaker units; a cabinet containing said plurality of speaker units therein, one end of said cabinet being rotatably mounted to a rear portion of a ceiling panel of said vehicle such that said cabinet can be swung between a first position where a speaker mounting surface of said cabinet is substantially parallel with said ceiling panel, and a second position where said speaker mounting surface is in a substantially upright position; locking means for locking said cabinet in said first position; a supporting mechanism for swingably supporting at least one of said speaker units with respect to said cabinet, and a sealing member disposed between the swingably supported speaker unit and said cabinet for maintaining air tightness of said cabinet.

* * * * *